US012578143B2

(12) United States Patent
Mochizuki

(10) Patent No.: US 12,578,143 B2
(45) Date of Patent: *Mar. 17, 2026

(54) MOLTEN METAL FURNACE

(71) Applicant: TOUNETSU CO., LTD., Shizuoka (JP)

(72) Inventor: Kiyata Mochizuki, Shizuoka (JP)

(73) Assignee: Tounetsu Co., Ltd., Shizuoka (JP)

( * ) Notice: Subject to any disclaimer, the term of this patent is extended or adjusted under 35 U.S.C. 154(b) by 310 days.

This patent is subject to a terminal disclaimer.

(21) Appl. No.: 18/038,866

(22) PCT Filed: Dec. 21, 2021

(86) PCT No.: PCT/JP2021/047181

§ 371 (c)(1),
(2) Date: May 25, 2023

(87) PCT Pub. No.: WO2022/201690

PCT Pub. Date: Sep. 29, 2022

(65) Prior Publication Data

US 2024/0019212 A1 Jan. 18, 2024

(30) Foreign Application Priority Data

Mar. 25, 2021 (JP) ................................ 2021-051699

(51) Int. Cl.
*F27D 1/00* (2006.01)
*F27D 15/00* (2006.01)

(52) U.S. Cl.
CPC ........... *F27D 1/0003* (2013.01); *F27D 15/00* (2013.01)

(58) Field of Classification Search
CPC .......... F27D 1/0003; F27D 15/00; F27D 1/00; F27D 1/0006; F27D 1/0009; B22D 18/04;
(Continued)

(56) References Cited

U.S. PATENT DOCUMENTS 4,009,023 A * 2/1977 Oberg .................... C21C 7/076 75/533
4,449,221 A * 5/1984 Keller ...................... F27D 9/00 373/44

(Continued)

FOREIGN PATENT DOCUMENTS

CN 208381291 U 1/2019
JP S5770072 * 4/1982 ........... F27D 1/0003

(Continued)

OTHER PUBLICATIONS

JP2018012131, Murakami, Molten Metal Holding Furnace for Low-Pressure Casting, Jan. 25, 2018 (Year: 2018).*

(Continued)

*Primary Examiner* — Jessee R Roe
*Assistant Examiner* — Michael Aboagye
(74) *Attorney, Agent, or Firm* — Andrus Intellectual Property Law, LLP

(57) ABSTRACT

A molten metal furnace in which molten metal leakage may be avoided or controlled and heat radiation from the furnace body may be controlled. The molten metal furnace has an outer wall on its outer periphery, a molten metal storage part for holding a molten metal therein, and an inner wall forming the molten metal storage part and having a plurality of lining layers, wherein a first lining layer of the plurality of lining layers, having a surface to be in contact with the molten metal, is formed of a refractory material, wherein a sealing material is provided along at least two boundaries present in a range between the first lining layer and the outer wall, and wherein a lining layer sandwiched between layers of the sealing material is formed of a thermal insulation board containing at least silicon dioxide ($SiO_2$).

2 Claims, 9 Drawing Sheets

(58) Field of Classification Search
CPC ........ B22D 18/06; B22D 41/01; B22D 41/02; B22D 45/00
USPC .................................................. 266/280, 281
See application file for complete search history.

(56) References Cited

U.S. PATENT DOCUMENTS

| | | | | |
|---|---|---|---|---|
| 6,994,148 | B1 * | 2/2006 | McKibben | B22D 41/02 164/335 |
| 11,850,658 | B2 * | 12/2023 | Mochizuki | B22D 41/02 |
| 2018/0124877 | A1 | 5/2018 | Mochizuki | |

FOREIGN PATENT DOCUMENTS

| | | | | |
|---|---|---|---|---|
| JP | 58-224289 | | 12/1983 | |
| JP | U1991-067894 U | | 7/1991 | |
| JP | 2005-351602 | | 12/2005 | |
| JP | 2012-131672 | | 7/2012 | |
| JP | 2017-194236 | | 10/2017 | |
| JP | 2018012131 | * | 1/2018 | F27D 1/0003 |
| JP | 6644776 | | 2/2020 | |
| WO | WO02/058863 | * | 1/2002 | C03B 5/42 |

OTHER PUBLICATIONS

JPS5770072, Nakatsuka, Heat Insulation Device for Molten metal, Apr. 30, 1982 (Year: 1982).*
International Search Report for PCT/JP2021/047181, dated Mar. 1, 2022.

* cited by examiner

【FIG.1】
Related Art
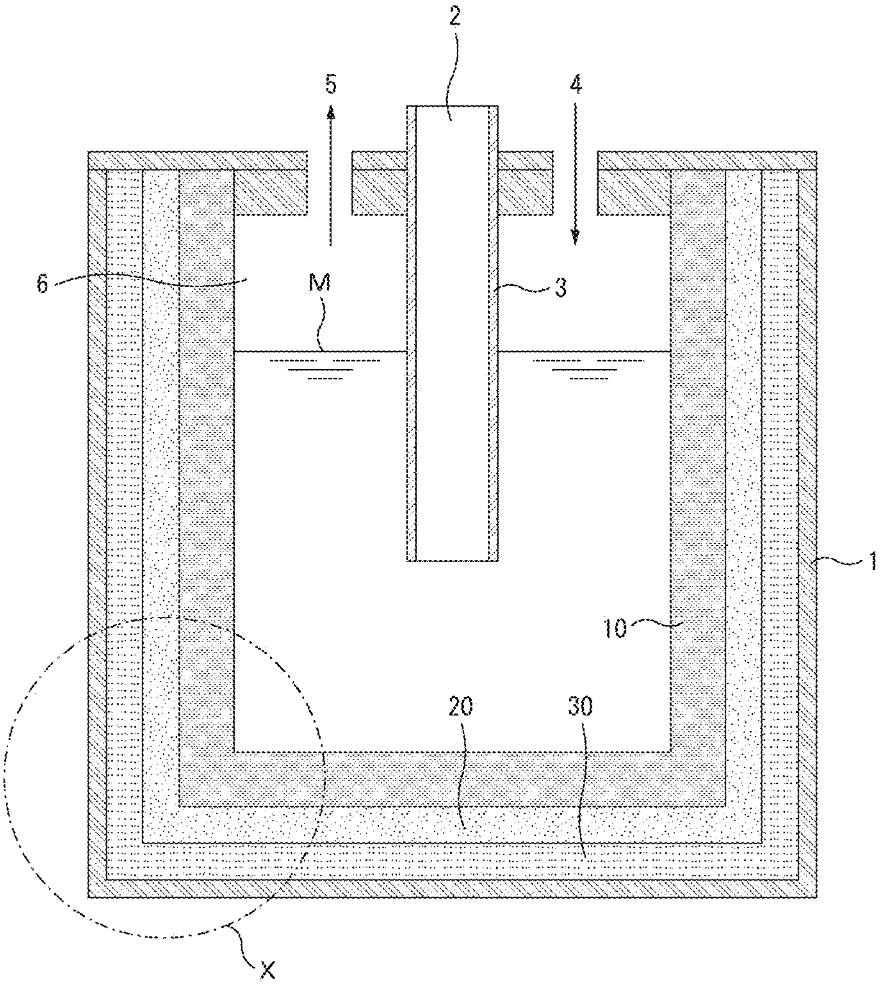

【FIG.2】
Related Art
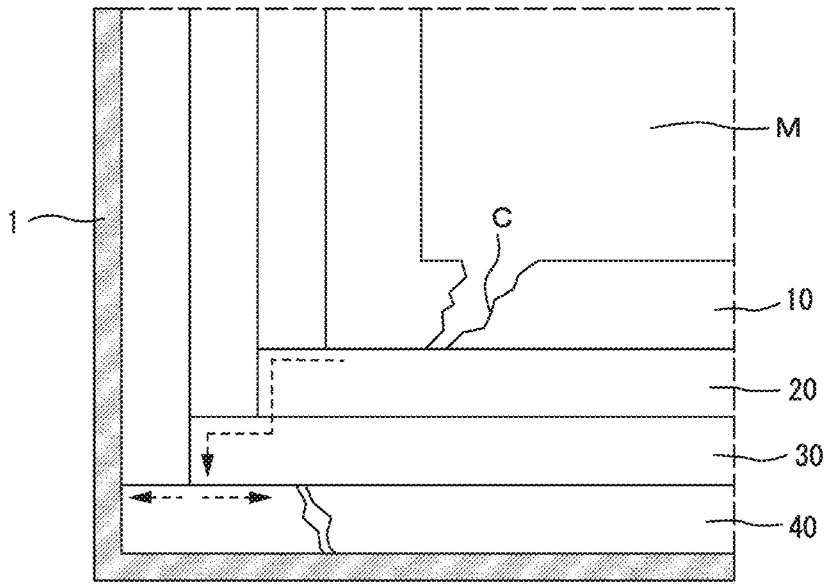

[FIG.3]
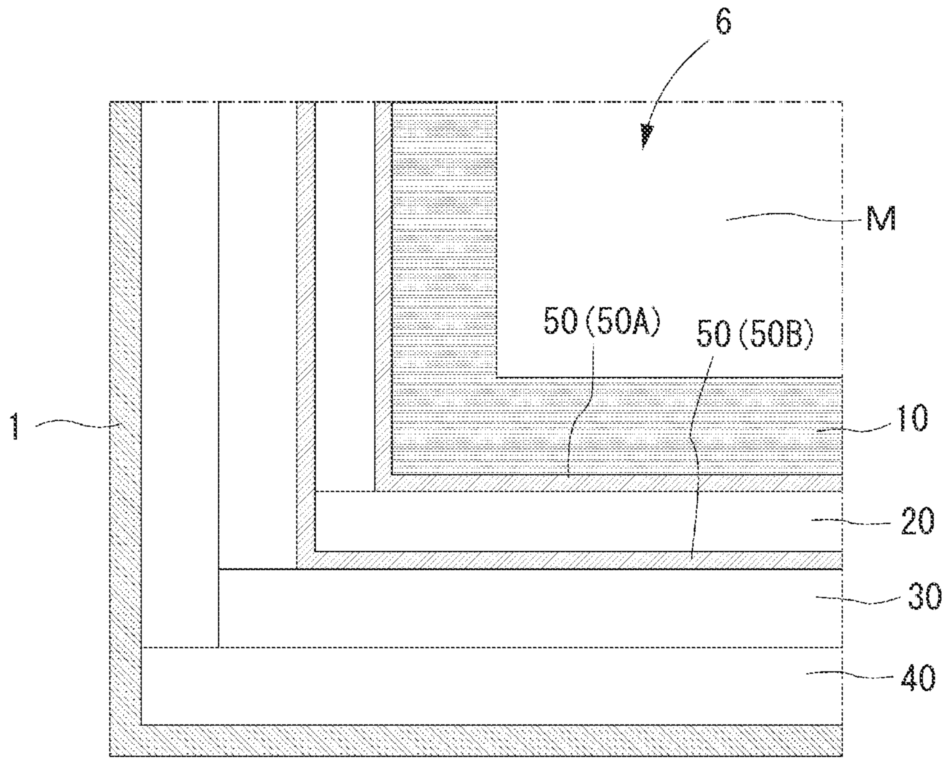

[FIG.4]
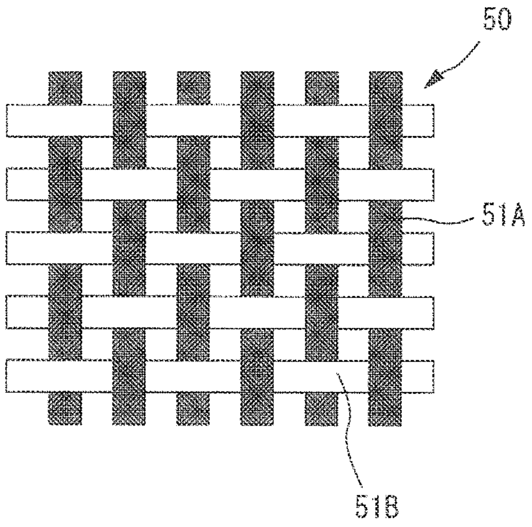

[FIG.5]
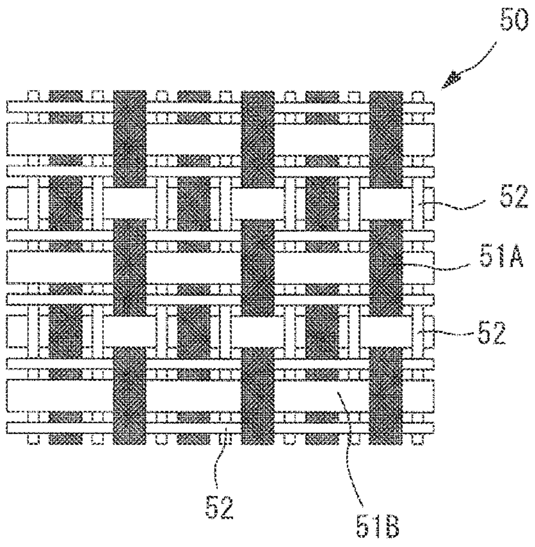

【FIG.6】
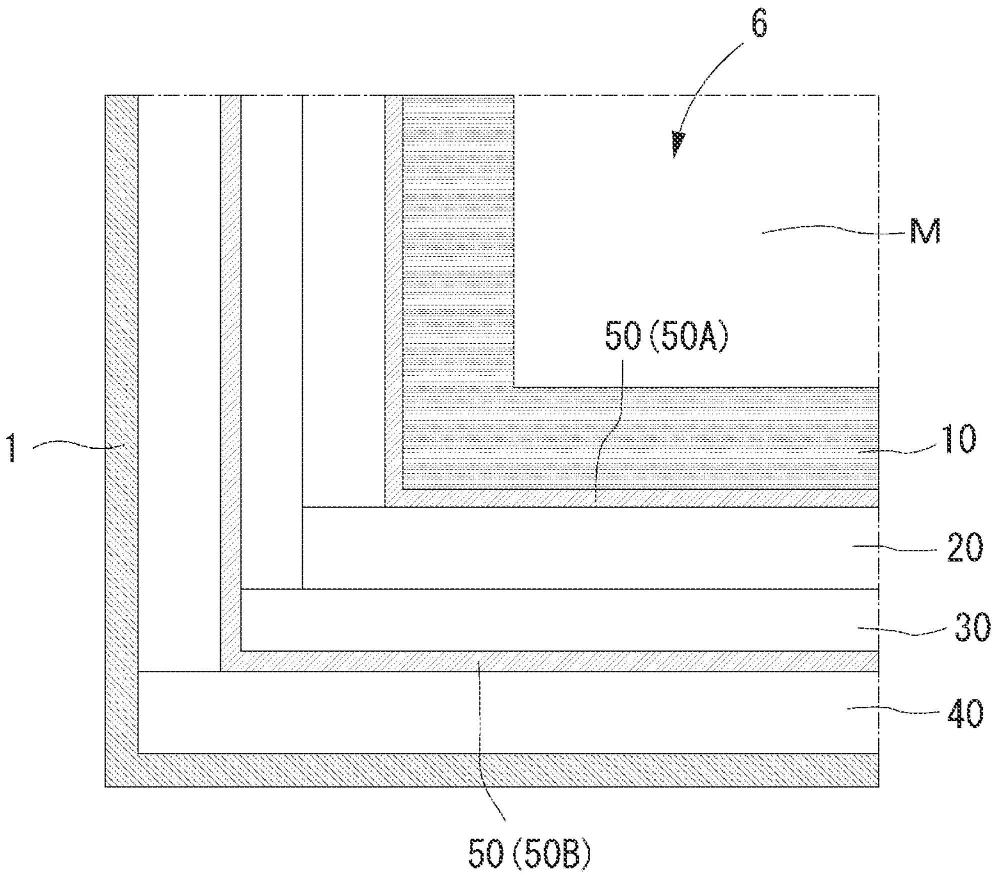

[FIG.7]
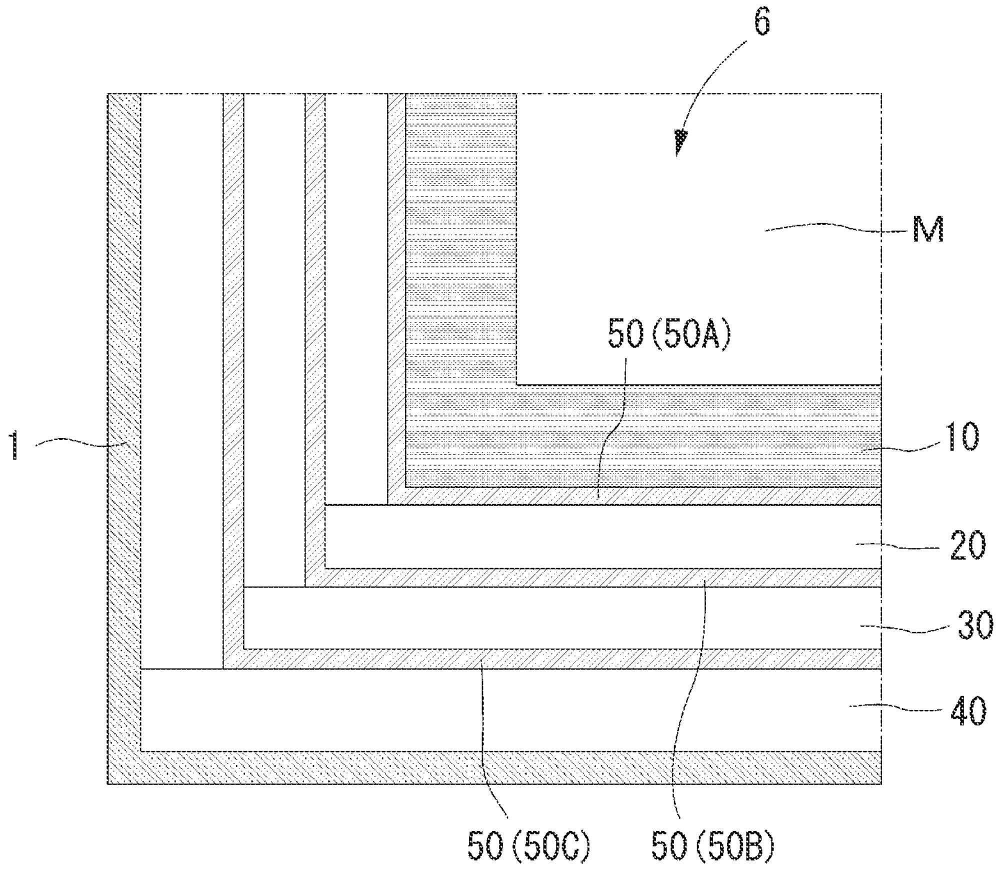

[FIG.8]
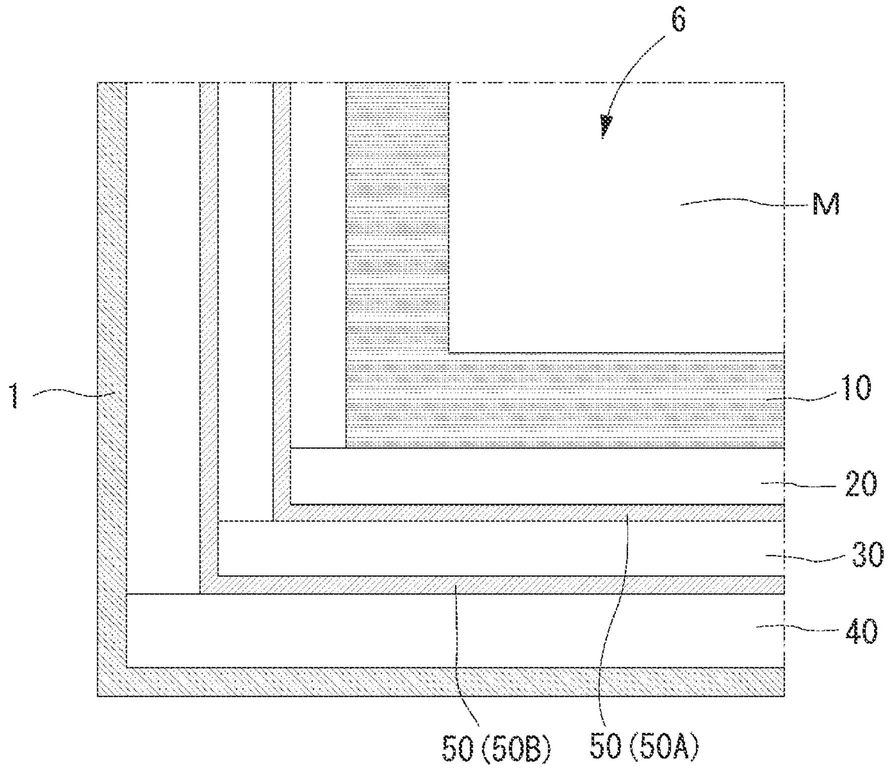

[FIG.9]
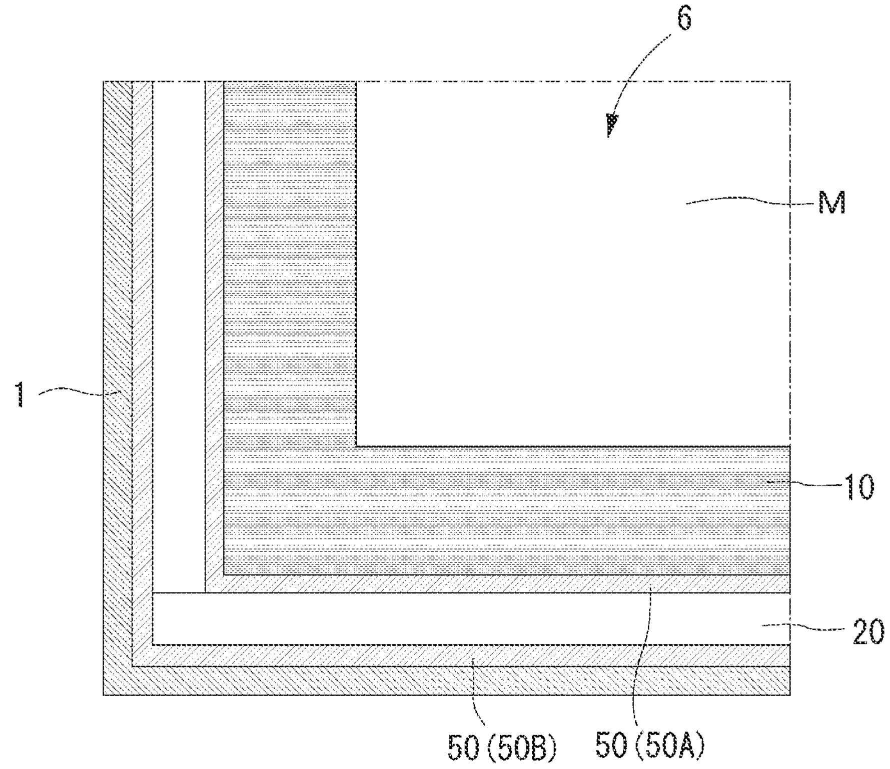

MOLTEN METAL FURNACE

CROSS-REFERENCE TO RELATED APPLICATIONS

This application is the U.S. national stage application of International Application PCT/JP2021/047181, filed Dec. 21, 2021, which international application was published on Sep. 29, 2022, as International Publication WO 2022/201690 in the Japanese language. The International Application claims priority of Japanese Patent Application No. 2021-051699, filed Mar. 25, 2021. The international application and Japanese application are both incorporated herein by reference, in entirety.

FIELD OF ART

The present invention relates to a molten metal furnace for holding a molten metal of, for example, aluminum, aluminum alloys, or non-ferrous metals.

BACKGROUND ART

There is conventionally known a melting and holding furnace for melting and holding a molten metal of aluminum, aluminum alloys, non-ferrous metals, or the like (for example, see Patent Publication 1). A furnace body of a common melting and holding furnace is composed of a bottom wall and a peripheral wall or side walls extending vertically from the peripheral edges of the bottom wall. The bottom wall and the side walls generally have, in order from outside inwards, an outer wall made of iron (steel shell) and lining materials, such as a heat insulting layer, a back-up layer, and a refractory layer (referred to also as a refractory product or a refractory material hereinbelow), and a molten metal storage part for holding the molten metal therein is formed inside the refractory layer.

In such a melting and holding furnace, a lining material, in particular the refractory layer to be in contact with a molten metal, is formed of refractory precast blocks, refractory bricks, or castable refractories, or the like. Molten metal has a property of easily permeating the structure of such refractory layer.

For example, it happened that oxides were formed in an aluminum alloy molten metal (referred to also as an aluminum molten metal hereinbelow), prolonged use or drastic temperature change caused easy cracking which damaged the furnace body, the aluminum molten metal permeated the cracking in the refractory layer to cause molten metal leakage, and the aluminum molten metal leaked out of the molten metal storage part.

In order to avoid molten metal leakage, Patent Publication 2 discloses a lining structure for a molten metal holding vessel, wherein the inner surface of a permanent lining is provided with a plurality of dents arranged in a staggered pattern, and covered with a mortar layer having a lower longitudinal elastic modulus. It was demonstrated that, with such a structure, the strain generated on the inner surface of the permanent lining was dispersed to avoid cracking and, even if cracks were formed on the inner surface of the permanent lining, the mortar layer could block the molten metal leakage.

PRIOR ART PUBLICATION

Patent Publication

Patent Publication 1: JP 6644766 B
Patent Publication 2: JP 2017-194236 A

SUMMARY OF THE INVENTION

Problems to be Solved by the Invention

As discussed above, Patent Publication 2 teaches how to avoid molten metal leakage, but is silent about measures for controlling heat radiation from the furnace body.

Heat radiation from the furnace body causes the following problems. It was necessary to continuously operate a heat source, such as an immersion heater or an immersion burner, for holding a molten metal at a certain temperature in the molten metal storage part. However, a conventional furnace body radiates heat, so that the heat source was supplied with energy, such as electric power or gas, more than necessary, which was inefficient. Further, the surface temperature of the furnace body or the ambient temperature around the furnace body tends to rise easily, which may lead to damages to workers, such as burn injury due to contact with the furnace body, or deterioration of the working environment.

Molten metal leakage may actually be coped with by using a refractory material of about 100 mm thick in the refractory layer, but after the lapse of 6 to 8 years from the beginning of use of the furnace, damages by cracking may be found in the furnace body.

Moreover, in continuous operation, where the operation is ceased only twice to four times a year for maintenance, it is extremely difficult to avoid molten metal leakage to outside, and dedication was required to secure safety of workers or deal with disadvantages in operation, such as decrease in heat quantity of molten metal.

It is therefore an object of the present invention to provide a molten metal furnace in which molten metal leakage may be avoided or controlled and heat radiation from the furnace body may be controlled.

Means for Solving the Problems

Means for solving the above problem is as follows.

A molten metal furnace including:

an outer wall on its outer periphery, and an inner wall forming a molten metal storage part for holding a molten metal therein, wherein the inner wall having a plurality of lining layers, wherein a first lining layer of the plurality of lining layers, having a surface to be in contact with the molten metal, is formed of a refractory material, wherein a sealing material is provided along at least two boundaries present in a range between the first lining layer and the outer wall, and wherein a lining layer sandwiched between layers of the sealing material is formed of a thermal insulation board containing at least silicon dioxide ($SiO_2$).

Effect of the Invention

According to the present invention, molten metal leakage may be avoided or controlled, and heat radiation from the furnace body may be controlled.

BRIEF DESCRIPTION OF THE DRAWINGS

FIG. 1 is a sectional view of an example of a molten metal furnace.

FIG. 2 is a sectional view for explaining molten metal leakage in area X in FIG. 1.

FIG. 3 is a sectional view showing an example of arrangement of the sealing material according to an embodiment of the invention.

FIG. 4 is a rear view of an example of a woven sealing material.

FIG. 5 is a rear view of an example of a woven sealing material, reinforced with reinforcement fibers.

FIG. 6 is a sectional view showing an example of arrangement of the sealing material according to another embodiment of the invention.

FIG. 7 is a sectional view showing an example of arrangement of the sealing material according to still another embodiment of the invention.

FIG. 8 is a sectional view showing an example of arrangement of the sealing material according to yet another embodiment of the invention.

FIG. 9 is a sectional view showing an example of arrangement of the sealing material according to a different embodiment of the invention.

EMBODIMENTS FOR CARRYING OUT THE INVENTION

Embodiments of the present invention will now be explained below.

As shown in FIG. 1, the molten metal furnace has an outer wall 1 on its outer periphery, and an inner wall forming a molten metal storage part 6 and including a plurality of lining layers, and holds a molten metal M therein.

The lining layers are composed of, for example as shown in FIG. 1, a first lining layer 10, a second lining layer 20, and a third lining layer 30.

The first lining layer 10 constitutes a surface to be in contact with the molten metal M, such as of aluminum or alloys thereof, and is composed of a refractory material. The refractory material may be, for example, a low-cement castable mainly composed of aluminum oxide ($Al_2O_3$), which is adjusted in water content to 10% or lower for construction, and then dried to have a density of 2500 to 3500 kg/m$^3$. The second lining layer 20, the third lining layer 30, and the like, will be discussed later.

The molten metal furnace may be any of various structures. The furnace of the structure shown in FIG. 1 is a molten metal holding furnace for low-pressure casting, whose details are as follows.

The furnace has a tap port 2 in the upper portion thereof, which is composed of a cylindrical stalk 3. The furnace has an air supply port 4 and an air discharge port 5 provided in the upper portion thereof, which allow supply/discharge of pressurized gas into/out of the molten metal holding chamber.

By means of a pressure device, not shown, pressurized gas, such as dry air or inert gas, e.g., argon or nitrogen, is fed through the air supply port 4 into the molten metal holding chamber. The pressurized gas fed into the molten metal holding chamber presses the molten metal surface, causing the molten metal to rise upward through the stalk 3 and be pressed into the cavity of a casting mold, not shown, through the tap port 2.

After completion of the casting, the supply of the pressurized gas through the air supply port 4 is ceased, and the pressurized gas in the molten metal holding chamber is discharged through the air discharge port 5.

In this kind of molten metal furnace, as discussed above and shown in the schematic view of FIG. 2 (embodiment having four lining layers), prolonged use or drastic temperature change tends to cause easy cracking C which damages the furnace body, and the molten metal, e.g., an aluminum molten metal, may permeate the cracking in the refractory layer to cause molten metal leakage. The outer wall 1 is made of, e.g., iron, and in an extreme case, the aluminum molten metal permeating the cracking may reach as far as the outer wall 1 to cause it to expand outwards due to the heat from the aluminum molten metal. An example of flow of the molten metal leakage is shown in broken lines in FIG. 2.

For addressing such problems, in the embodiment shown in FIG. 3, a sealing material 50 (first sealing material 50A) is provided between the first lining layer 10 and the second lining layer 20 located on the side of the first lining layer 10 closer to the outer wall, and a sealing material 50 (second sealing material 50B) is provided between the second lining layer 20 and the third lining layer 30 located on the side of the second lining layer 20 closer to the outer wall. Incidentally, two or more layers of sealing material 50, when provided, will be referred to as first sealing material 50A, second sealing material 50B, third sealing material 50C, and so on, in order from the inner wall side toward the outer wall side.

The sealing material 50 may preferably be in the form of a sheet, in particular with a thickness of 2 to 10 mm.

The sealing material 50 may particularly preferably be a woven sheet of at least either of ceramic fibers and bio-soluble ceramic fibers, and at least either of glass fibers and stainless steel fibers.

The bio-soluble ceramic fibers used in the present invention is selected from the fibers classified in Category 0 (exempt substances) in the “EU Directive 97/69/EC” regulation. Such a fiber needs to be a fiber whose safety is verified based on Nota Q “criteria for bio-soluble fibers” by any of the following four animal experiments, or a fiber in which a numerical value obtained by subtracting a value twice the standard deviation from the length weighted geometric average diameter exceeds 6 μm, based on Nota R “criteria for non-inhalable fibers”.

(1) a short term biopersistence test by inhalation has shown that the fibers longer than 20 μm have a weighted half-life less than 10 days; or (2) a short term biopersistence test by intratracheal instillation has shown that the fibers longer than 20 μm have a weighted halflife less than 40 days; or (3) an appropriate intra-peritoneal test has shown no evidence of excess carcinogenicity; or (4) no relevant pathogenicity or neoplastic changes are noted in a suitable long term inhalation test.

The bio-soluble ceramic fibers with the confirmed safety as discussed above may be used without any particular limitation on their production process, chemical composition, average fiber diameter, or average fiber length and, for example, bio-soluble rock wool may be used.

Those containing over 18 mass % oxides of alkali metals or alkaline earth metals ($Na_2O$, $K_2O$, CaO, MgO, BaO, or the like) may be used.

Silica-magnesia-calcia alkaline earth silicate wool or the like may be used.

As ceramic fibers, there are known amorphous refractory ceramic fibers (abbreviated as RCF hereinbelow) mostly for use at a regular use temperature of 1400° C. or lower, which are artificial mineral fibers mainly composed of alumina ($Al_2O_3$) and silica ($SiO_2$), and crystalline alumina ceramic fibers used at temperatures higher than 1400° C. These RCF and crystalline ceramic fibers are widely different in production method, performance, and cost, and used differently according to the respective characteristics.

Molten metal, in particular a molten metal of aluminum or an aluminum alloy, reaches a temperature as high as 700° C. or higher. In this regard, the at least either of the ceramic fibers and bio-soluble ceramic fibers are preferably reinforced with the at least either of the glass fibers and stainless steel fibers.

In particular, in view of heat resistance, it is preferred to reinforce at least with stainless steel fibers.

The sealing material 50 may take a sheet shape, in particular with a thickness of 2 to 10 mm, by weaving fiber threads (fibers or strands). The weaving may be, for example, plain weave as shown in FIGS. 4 and 5, twill weave, sateen weave, or any suitable weave.

As shown in FIG. 5, reinforcement fibers 52, which are at least either of glass fibers and stainless steel fibers, may suitably be woven into first fibers 51A, 51B, which are at least either of ceramic fibers and bio-soluble ceramic fibers. The reinforcement fibers 52 may be incorporated into strands for reinforcement. The strands having the reinforcement fibers incorporated therein may be woven into a suitable configuration to form a sheet-shaped sealing material.

As shown in FIG. 6, the sealing material 50 (second sealing material 50B) may be provided between the third lining layer 30 and the fourth lining layer 40 located on the side of the third lining layer 30 closer to the outer wall 1.

Further, as shown in FIG. 7, an embodiment may be envisaged wherein the sealing material 50 (first sealing material 50A) is provided between the first lining layer 10 and the second lining layer 20, the sealing material 50 (second sealing material 50B) is provided between the second lining layer 20 and the third lining layer 30, and the sealing material 50 (third sealing material 50C) is provided between the third lining layer 30 and the fourth lining layer 40.

According to the present invention, it suffices that the sealing material 50 is provided along at least two boundaries present in the range between the first lining layer 10 and the outer wall 1. For example, as shown in FIG. 8, the sealing material 50 (first sealing material may be provided along the boundary between the second lining layer 20 and the third lining layer 30, and the sealing material 50 (second sealing material 50B) may be provided along the boundary between the third lining layer and the fourth lining layer 40.

Further, as shown in FIG. 9, the sealing material (first sealing material 50A) may be provided along the boundary between the first lining layer 10 and the second lining layer 20, and the sealing material 50 (second sealing material 50B) may be provided along the boundary between the second lining layer 20 and the outer wall 1.

The sealing material 50, which has been provided between the adjacent lining layers as discussed above, may emit a burnt odor, when the molten metal M is first introduced into the molten metal storage part and the heat thereof is transferred via the first lining layer 10 to the sealing material 50. For the purpose of controlling this odor, the sealing material 50 may be fired in advance.

Conventionally, in coping with the molten metal leakage, a major focus has been on selection of material of the first lining layer. However, cracking of the first lining layer 10 cannot be avoided and is likely, and the risk of molten metal leakage through the cracking remains.

The present inventor has reached the present invention without focusing on the selection of material of the first lining layer 10, but on the premise of the cracking in the first lining layer 10.

Even if the molten metal leakage through the cracking occurs, molten metal leakage to the outer wall may be blocked, which is the ultimate goal, through minimization of amount of leakage, reduction of heat radiation outside the furnace, or directional control of leakage to avoid permeation up to the outer wall. Further, heat radiation from the furnace may be controlled.

Use of a sealing material, in particular a heat resistant (refractory) sealing material, according to the present invention provides the following advantages:

(1) the sealing material endures the molten metal temperature (e.g., for an aluminum molten metal, the sealing material endures a temperature as high as 700° C.);

(2) the sealing material will not contaminate the molten metal in the molten metal storage part;

(3) the sealing material is capable of lowering the heat quantity of the leaked molten metal to keep the leaked molten metal from permeating up to the outer wall: and (4) the sealing material is capable of controlling direction of molten metal leakage, where occurred.

In general, leaked molten metal moves downwards by gravity along and between the adjacent lining layers and, when reaches a horizontally-extending lining layer located closer to the outer wall, spreads in the horizontal direction. Depending on circumstances, the horizontally-extending lining layer located closer to the outer wall may be cracked, and the molten metal leakage may spread through the cracking by gravity, so that the direction of leakage cannot be predicted.

The sealing material 50 according to the present invention provided between the adjacent lining layers hinders downward movement by gravity of the leaked molten metal along and between the adjacent lining layers (i.e., the rate of downward movement may be regulated), with the sealing material 50 acting as a resistance. Then, the leaked molten metal is dispersed while flowing along the woven fibers of the sealing material 50, so that the heat quantity (heat capacity per unit area) of the leaked molten metal is lowered. In addition, since the first sealing material 50A and the lining layer located on the side of the first sealing material 50A closer to the molten metal storage part 6 are made of different materials, heat conduction from the lining layer to the first sealing material 50A may be limited. As a result, the molten metal leaking out to the lining layer located on the side of the first sealing material 50A closer to the outer wall 1 may be significantly reduced. Depending on the size of the cracking, the amount of molten metal leakage may vary, but by providing a second sealing material 50B along any of the boundaries present in the range between the outer wall 1 and the lining layer located on the side of the first sealing material 50A closer to the outer wall 1, reduction of heat radiation outside the furnace (as the second sealing material 50B and the lining layer located on the side of the second sealing material 50B closer to the molten metal storage part 6, and/or the second sealing material 50B and the lining layer located on the side of the second sealing material 50B closer to the outer wall 1, are made of different materials, heat conduction between the second sealing material 50B and the respective lining layers may be limited), directional control of leakage, and regulation of molten metal permeation up to the outer wall 1 may further be achieved. Further, the plurality of disposed layers of sealing material 50 hinders the molten metal to be brought into direct contact with the lining layer located on the side of the respective layers of the sealing material closer to the outer wall 1, leading to reduced risk of cracking.

As used herein, the directional control of molten metal leakage, when occurred, refers specifically to reduction of the rate of molten metal leakage by narrowing the space between the adjacent lining layers with the sealing material 50 to increase the resistance, and regulation of molten metal permeation up to the outer wall.

A lining layer sandwiched between a plurality of layers of sealing material 50 stacked in the thickness direction, like the second lining layer 20 in the embodiment shown in FIG. 3, is preferably formed of a thermal insulation board containing at least silicon dioxide ($SiO_2$), such as a ceramic fiber board or a board containing xonotlite. Such a lining layer, when employed as a lining layer sandwiched between layers of the sealing material 50, may save weight as will be discussed later, i.e., have a lower density, and may be more handleable, compared to the second lining layer 20 commonly used hitherto (a refractory castable, e.g., mainly composed of aluminum oxide ($Al_2O_3$), adjusted in water content to 45 to 65% for construction, and then dried to have a density of 1000 to 1500 kg/m$^3$). The lining layer sandwiched between layers of the sealing material 50 and having a lower density is harder to conduct heat, compared to the first lining layer 10. In other words, the temperature drop across the lining layer sandwiched between layers of the sealing material 50, from the side closer to the molten metal storage part 6 to the side closer to the outer wall 1, is larger than the temperature drop across the first lining layer 10 from its side closer to the molten metal storage part 6 to the its side closer to the outer wall 1. In this way, heat conduction from the lining layer sandwiched between layers of the sealing material 50 to outside (e.g., to the neighboring layers, such as the third lining layer 30 and the fourth lining layer 40 in the embodiment shown in FIG. 3) is discouraged, which may lead to avoiding of molten metal leakage outside the furnace and heat radiation from the furnace body.

Further, the density of the second lining layer 20 in the embodiment shown in FIG. 3 is preferably 250 kg/m$^3$ or higher and lower than 1000 kg/m$^3$, more preferably 350 to 450 kg/m$^3$. At a density lower than 250 kg/m$^3$, the second lining layer 20 is prone to permeation of the molten metal M which, in the molten metal storage part 6, applies pressure to the second lining layer 20 via the first lining layer 10 and the first sealing material 50A. At a density of 1000 kg/m$^3$ or higher, the second lining layer 20 is hard on its surface, which causes difficulties in fixing the sealing material 50 to the second lining layer 20 by tapping, which is one of the techniques to fix the sealing material 50 to the second lining layer 20. Further, at a density of 1000 kg/m$^3$ or higher, the second lining layer 20 is too heavy and prone to cracking, which may lead to difficulties in handling and susceptibility to heat conduction, so that the temperature drop across the second lining layer 20 from its side closer to the molten metal storage part 6 to its side closer to the outer wall 1 is not sufficient.

The second lining layer 20 in the embodiment shown in FIG. 3 is preferably formed of a thermal insulation board containing at least silicon dioxide ($SiO_2$), such as a ceramic fiber board or a board containing xonotlite. With the lining layer sandwiched between layers of the sealing material 50, heat radiation from the furnace body may be controlled.

The second lining layer 20 in the embodiment shown in FIG. 3 has been discussed so far. Similarly, the second lining layer 20 and the third lining layer 30 in the embodiment shown in FIG. 7, the third lining layer 30 in the embodiment shown in FIG. 8, and the second lining layer in the embodiment shown in FIG. 9 are the lining layers sandwiched between layers of the sealing material 50. Accordingly, it is preferred to adopt the board and the density as discussed above to these layers.

Note that a lining layer located outside the outermost sealing material 50 (the second sealing material in the embodiment shown in FIG. 3), like the third lining layer 30 and the fourth lining layer 40 in the embodiment shown in FIG. 3, which is formed of conventionally and commonly used fibers containing at least one of aluminum oxide ($Al_2O_3$) and silica ($SiO_2$), or boards containing calcium silicate as a main component and having a density of 150 to 250 kg/m$^3$, or the like, is used to ensure thermal insulation and heat resistance.

Further, in the illustrated embodiments, the number of the lining layers is at most four (up to the fourth lining layer 40, but may be five or more. In that case, the sealing material 50 may be provided inside the fifth or subsequent layer.

The conventional design concept was to combine the second lining layer 20 formed of a refractory material having a density of 1000 to 1500 kg/m$^3$ with the first lining layer 10 formed of a refractory material having a density of 2500 to 3500 kg/m$^3$. This blocked flow of the molten metal leakage or controlled its flow rate even when the first lining layer 10 was cracked, which had a surface in contact with the molten metal M, such as aluminum or an alloy thereof as discussed above. Further, the third lining layer 30 and the fourth lining layer 40 formed of fibers containing at least one of aluminum oxide ($Al_2O_3$) and silica ($SiO_2$), or boards containing calcium silicate as a main component and having a density of 150 to 250 kg/m$^3$, or the like, were used to lower the temperature of the leaked molten metal to avoid molten metal leakage outside the furnace.

In contrast, the design concept according to the present invention is to combine the lining layer formed of a thermal insulation board containing at least silicon dioxide ($SiO_2$) and sandwiched between layers of the sealing material 50 with the first lining layer 10 formed of a refractory material having a density of 2500 to 3500 kg/m$^3$. By means of this combination, even when the first lining layer 10 is cracked, which has a surface in contact with the molten metal M, such as aluminum or an alloy thereof as discussed above, the lining layer formed of the thermal insulation board containing at least silicon dioxide ($SiO_2$) and sandwiched between layers of the sealing material 50 blocks flow of the molten metal leakage and, at the same time, hinders heat conduction to the outer side (e.g., to the neighboring layers, such as the third lining layer 30 and the fourth lining layer 40 in the embodiment shown in FIG. 3), which lead to avoiding of molten metal leakage outside the furnace and heat radiation from the furnace body.

In this way, since the lining layer formed of the thermal insulation board containing at least silicon dioxide ($SiO_2$) and sandwiched between layers of the sealing material 50 acts both to block flow of the molten metal leakage and to control heat radiation from the furnace body, part of the conventional back-up layers for blocking flow of molten metal leakage may be omitted or reduced in thickness, and the thickness of each lining layer may be reduced from the conventional thickness. Consequently, the molten metal furnace itself may be made smaller. In other words, the size of the molten metal furnace may be made smaller with the same volume of the molten metal storage part as the conventional. Even with the volume of the molten metal storage part somewhat larger than the conventional, the size of the molten metal furnace may be made the same as or smaller than the conventional.

INDUSTRIAL APPLICABILITY

The molten metal may be of aluminum or an aluminum alloy, or any other molten metal.

Note that the technical scope of the present invention is not limited to the embodiments discussed above, and various changes and modifications may be made therein without departing from the spirit and scope of the invention. For example, the molten metal furnace according to the present invention may be applied to a melting and holding furnace, melting furnace, holding furnace, or low-pressure casting furnace.

DESCRIPTION OF REFERENCE NUMERALS

1: outer wall
10: first lining layer
20: second lining layer
30 third lining layer
40: fourth lining layer
50: sealing material
50A: first sealing material
50B: second sealing material
50C: third sealing material
M: molten metal

The invention claimed is:

1. A molten metal furnace comprising:

an outer wall on its outer periphery; and an inner wall forming a molten metal storage part for holding a molten metal therein, wherein the inner wall includes a plurality of lining layers, wherein a first lining layer of the plurality of lining layers, having a surface to be in contact with the molten metal, is formed of a refractory material, wherein a sealing material is provided in each of at least two positions selected from the group consisting of between any two adjacent lining layers of the plurality of lining layers and between the outer wall and a lining layer of the plurality of lining layers adjacent thereto, wherein the sealing material is in a form of a woven sheet of at least either of ceramic fibers and bio-soluble ceramic fibers, and at least either of glass fibers and stainless steel fibers, wherein a lining layer sandwiched between layers of the sealing material is formed of a thermal insulation board containing at least silicon dioxide ($SiO_2$).

2. The molten metal furnace according to claim 1, wherein the thermal insulation board includes at least one of a ceramic fiber board and a board containing xonotlite.

* * * * *